Oct. 27, 1953
W. W. GOTSHALL
2,656,902
INSULATED HEAT CONDUCTING UNIT
Filed May 1, 1951
2 Sheets-Sheet 1
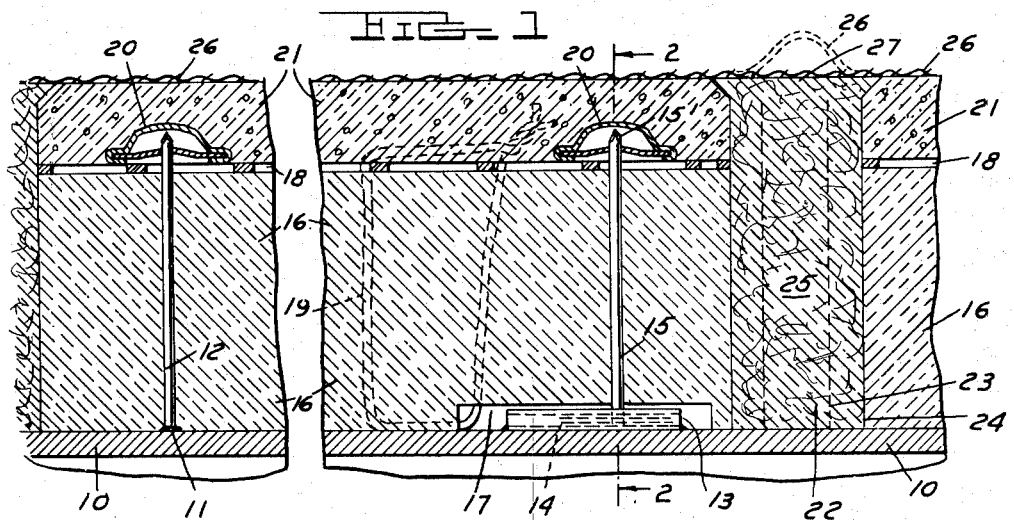
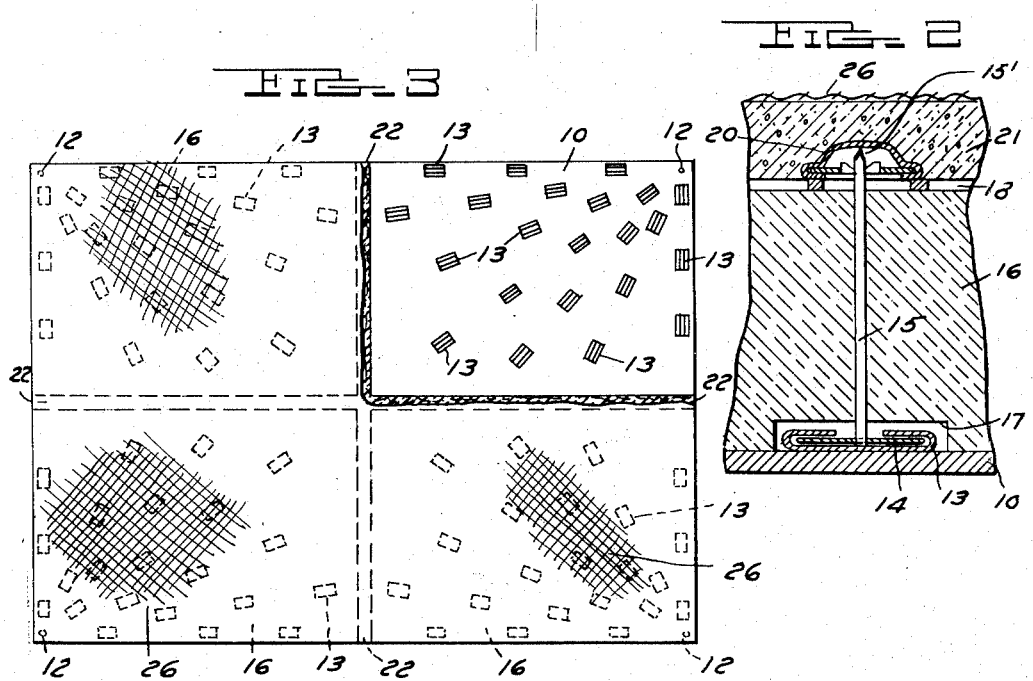
INVENTOR.
WILLIAM W. GOTSHALL
BY Thomas J. Hughes
ATTORNEY Oct. 27, 1953  W. W. GOTSHALL  2,656,902
INSULATED HEAT CONDUCTING UNIT
Filed May 1, 1951  2 Sheets-Sheet 2
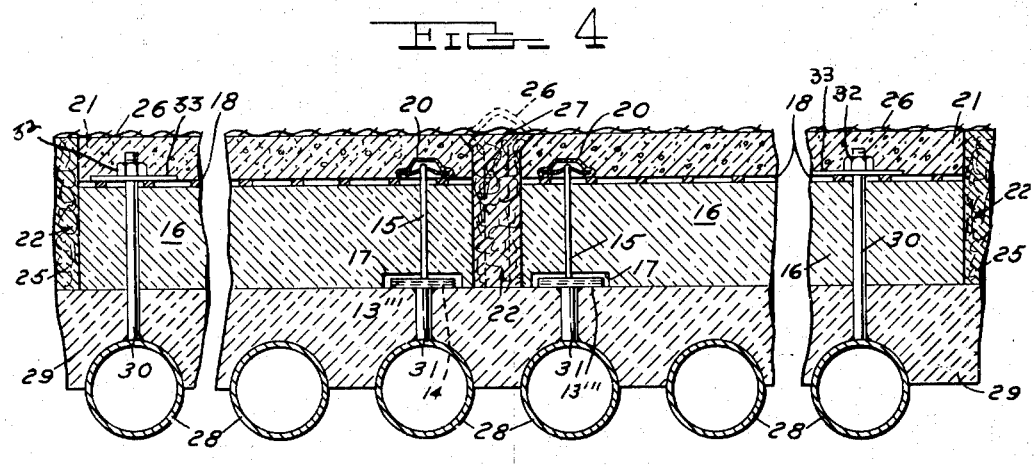
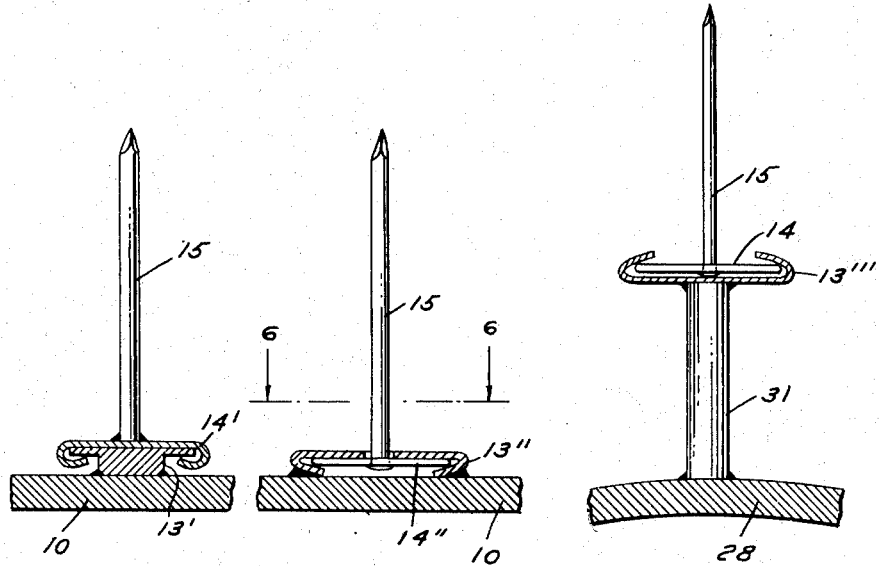
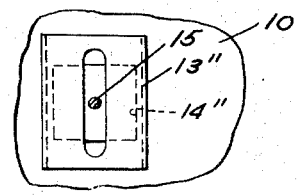
INVENTOR.
WILLIAM W. GOTSHALL
BY
Thomas J Hughes
ATTORNEY Patented Oct. 27, 1953

2,656,902

UNITED STATES PATENT OFFICE 2,656,902

INSULATED HEAT CONDUCTING UNIT

William W. Gotshall, Detroit, Mich.

Application May 1, 1951, Serial No. 223,989

3 Claims. (Cl. 189—34)

This invention relates to the means and method of attaching insulation to heated flat surfaces, such as heat conducting ducts, boiler walls and the like employed in industrial and large heating plants.

Heretofore, in the application of insulation to flat surfaces such as heat conducting ducts and the like, it has been the practice to first cover the surface with a layer of insulating blocks which are permanently attached to the surface and then covering the entire outer surface of the blocks with a continuous coat of insulating cement. When heat subsequently is dispatched through the duct, with resultant expansion of the duct walls through increased temperatures of the latter, as also when there is a lowering of the temperature of such walls, parting and splitting of such insulation inevitably takes place with consequent loss of heat through these openings and such loss continues until the cracks or openings are filled with a cement paste insulation. Such parting and splitting of the insulation and the repair thereof constitute a recurring major nuisance, not to mention the more or less ugly appearance that patched insulating surfaces present; and, it is an object of this invention to provide a method and means of securing insulation to the aforesaid walls in sections or panels in such a manner that parting or splitting of the insulation is eliminated and the refilling of breaks therein dispensed with.

A further object of this invention is to permanently pin each section or panel of insulation to but one spot or point of the duct wall, for obviously if the entire section were permanently secured to such wall at any more than at one point the section, as heretofore stated, would be pulled apart upon the expansion and contraction of the wall due to temperature changes therein; and, to insure that the section so secured at but one point will not pull apart, I impale each such section not only upon the permanent pin aforesaid but also upon the prongs of a suitable number of pins the heads of which are guidably mounted in trackways, which trackways are welded to the outer surface of the duct walls, so that upon any expansion or contraction of the walls the trackways will move therewith relative to said heads and the prongs of such heads, whereby upon such movement the impaled section will remain stationary on the pins.

A further object of this invention is to secure each separate section or panel of insulation to the outer walls of the duct by means of a group of pins and guiding trackways for each section and impale each such panel upon the pins, and while the latter remain stationary relative to each other as well as to its impaled panel, the trackways only will move because I have welded the latter directly to the duct walls. In consequence, when the metal walls expand and contract the trackways will move therewith riding past the pins the heads of which are guidingly engaged by the trackways. Thus because there is no connection of the track guided pins with the duct walls, there can be no stresses, strains or pulling by such pins upon the insulated panel sections and it is because of this sliding relationship existing between the heads of such pins and trackways that breaking and tearing of the sections is eliminated.

A further object of the invention is to provide expansion joints between each insulating panel or section and to pack each joint with a suitable amount of glass wool of the curly variety and to so retain the wool therein as to successfully prevent the escape of heat between the panel sections upon movement of the duct wall due to expansions and contractions thereof upon any temperature changes therein.

A further object of my invention is to utilize my method and means of insulation in boiler wall constructions to thereby entirely eliminate the use of welded steel shells which are now considered necessary and essential in order to encase boiler walls to prevent the escape of heat caused by cracked insulation resulting from boiler tube and header expansion. In the employment of my method and means of insulation, boiler walls can be insulated in exactly the same manner as duct work as long as the unit expansion of the tubes is the same as that of the headers to which they are connected, since any two points on a metal surface would react the same as on a flat sheet of steel. The only difference in such application being the necessity of having the tracks and permanent pins welded directly to the boiler tubing.

The foregoing, together with further objects, features, and advantages of my invention, are set forth in the following description of specific embodiments thereof, illustrated in the accompanying drawings, wherein:

Fig. 1 is a vertical longitudinal cross section showing the method and means of applying insulation to a flat wall of a heating duct.

Fig. 2 is a vertical transverse section, taken on the line 2—2 of Fig. 1.

Fig. 3 is a plan view, partly in section, illustrating a portion of the insulating panel sections and the plurality of pin guideways in position with respect to the duct wall.

Fig. 4 is a vertical longitudinal section showing the method and means of applying insulation to a boiler wall construction.

Fig. 5 illustrates various pins and guideways, partly in section, employed in supporting and holding my insulating material relative to the duct and tube heat conducting surfaces.

Fig. 6 is a top or plan view taken on the line 6—6 of Fig. 5.

In the embodiment of my invention, before applying my insulation I first take into consideration the outer dimensions (length, depth and width) of the ducts, the maximum temperature of the heat that will be conducted through the duct, as well as the amount of expansion and contraction of the metal walls that will take place due to the application and withdrawal of such heat from said walls. This data is of vital importance, as it is necessary beforehand to know to what extent the metal of the duct walls 10 will expand and contract due to temperature changes therein. Upon ascertaining these facts I theoretically divide the outer walls of the ducts into any required number of sections (only four of which are shown in Fig. 3), the number of such sections depending entirely upon the size of the duct walls and the extent of their expansion and contraction. Then within the areas of each such section I weld the head 11 of a pin 12 to the wall 10, for a purpose subsequently to be described. As pin 12 is a permanent fixture in each section, it should be understood that such pins should be so located or placed so that there will be no movement away from corners or stiffeners during temperature changes in the metal. I also fixedly secure, as by welding to the surface of the walls 10, a plurality of tracks or pin head guideways, which tracks or guideways may be of the forms shown as 13, 13', 13'' or 13''' (Figs. 2 and 5). These tracks are located in spaced apart relationship to each other and extend radially away from permanent pin 12, with the longitudinal axes of each such track pointing directly to pin 12. Each of said tracks is approximately 3'' in length by 1¼'' in width. The number of such tracks and their respective distances from the pins are mathematically determined for each section upon the amount of expansion of the metal duct walls and the sizes of the insulating panels. Thus the distance between the permanent pin 12 and the track 13 farthest removed from said pin is multiplied by the change in temperature times the coefficient of expansion, which calculation gives the amount of expansion in the metal from which calculation a suitable number of tracks can be adequately disposed on the duct surfaces intermediate the farthest removed track and the permanent pin 12. The purpose of each of these fixed tracks or guideways is to receive and engage the head 14, 14' or 14'' of a pin 15, whereby each track 13, upon the expansion or contraction of the duct walls 10 will move with such walls while the pins 15, remain stationary as the aforesaid tracks move relative thereto.

Upon completion of the welding of the permanent pin 12 and of the guideways 13 as aforesaid to their predetermined locations on the various sections of the duct wall surfaces and the engagement of the pin heads 14 of pins 15 in guideways 13 I, in effect, provide groups of upstanding pins or prongs—one such group for each panel section. I then impale an insulating panel or block 16 over the aforesaid pins of each sectional group. In so impaling each such panel they assume the positions relative to each other upon the duct wall as illustrated in Figs. 1 and 3, and when so impaled they are pushed down against the duct walls. It will be observed that this application of the various insulating sections 16 results in embedding both the permanent pin 12 as well as the pins 15 through the sections (as shown particularly in Figs. 1 and 2) so that all of the pins are always stationary in said panels, then when any temperature changes take place in the duct walls 10, the expansion or contraction of such walls will result in the panels 16 remaining stationary on the pins while the walls 10 move, carrying the said guideways in a direction toward or away from the location of the permanent pin 12, thereby in effect sliding the trackways relative to the pins 15 and the heads 14 thereof. Thus there is no breaking or parting of the insulating panels induced by the expansion or contraction of the metal walls 10.

As the tracks or guideways 13 extend upwardly from the outer surface of the duct walls 10, it is essential that provision be made in the insulating panels 16 for such tracks to extend part way up into but free of any contacting engagement with the panels, thereby obviating any frictional engagement therewith. To this end I cut recesses or slots 17 of appropriate sizes in the inner surface of each panel adjacent each track.

Upon impaling the said panels on each section's pins 12 and 15, the stem or prong portions 15' of each such pin is forced through the panel and through the outer wall thereof, to which outer wall I have previously secured a section of stucco lath 18 which is held in place on each panel by tie wires 19. Then over the outwardly extending points of each pin I employ a metallic clip 20 with which to retain said pins in position relative to said panels and lath. To the lath 18 of each such section I apply a coating of insulating and finish cement 21. Each such section as thus formed and constituted comprises a composite panel or section of insulation. In securing these sections to the duct walls, I make provision between the lateral sides or edges thereof for an expansion joint 22 (Figs. 1 and 3). The vertically placed dotted lines 23 indicate the spacing existing between the adjacent insulating panel sections 16 when the duct walls are cold, while the full lines 24 of the sections indicate such spacing when the walls are hot. Into each such joint 22 I pack a suitable quantity of flexible insulating material 25, such as curly glass wool or mineral wool, so that upon the expansion or contraction of the aforesaid walls such material will adequately insulate these spaces. Then, to the outer surfaces of the insulating coatings 21 I paste a continuous strip of canvas 26. This strip is applied when the duct surfaces are hot, as at such time the width of the spaces between the various insulating panels aforesaid is at the maximum distance. This canvas 26 being continuous sealingly extends over the outer openings 27 to each joint 22 and is shown (Fig. 1) in full lines and in dotted lines above such openings to indicate respectively the assumed positions of the canvas at such openings upon the expansion and contraction behaviour of the duct walls.

In Fig. 4, I disclose the method and means of applying insulating material to a boiler wall construction. Heretofore in boiler construction work the methods of applying insulation inevitably resulted in the development of cracks and leaks in such insulation with consequent costly leakage of heat: and, in order to safeguard against such leakage and to insure an air seal it was considered necessary to enclose the insulated boiler walls within an air tight welded steel casing. My means and method of applying insulation to boilers not only dispenses with the requirement of a steel casing wall, but also eliminates all cracks and air leaks. In my improved application of such insulation, here referred to, I have shown a suitable number of boiler tubes 28 disposed within a boiler fire box (not shown). Disposed above the upper portions of such tubes is the usual boiler refractory material 29.

As was the case in the application of the insulation to the duct walls aforesaid, wherein I welded a pin 12 and a number of tracks 13 to the metal duct walls, in this boiler wall insulation installation I in like fashion secure similar pins and tracks, presently to be described, to the metallic surfaces of the tubes 28. The locations of the permanently welded pins and of said trackways are determined in the same manner as was heretofore described with respect to the application of the insulation to the duct work.

To secure my insulation to the boiler wall construction, I again divide the boiler wall into sections and weld the head of a pin 30 to the upper surface of a boiler tube within each section. Then to selected spots of the several boiler tubes within such section I weld the ends of stem supports 31 for tracks 13''', such tracks being disposed radially outward from permanent pin 30, and I engage the head 14 of a pin 15 in each of the aforesaid tracks 13'''. I again impale an insulating panel or block 16 on each of said pins, as was the case with the duct installations. Subsequently, to complete the application of the insulation, I apply the stucco lath 18, the insulating and finish cement 21 and the outer strips of continuous canvas 26 respectively to the outer surfaces of the panels 16 in the identical manner as heretofore described with respect to the duct installation. The expansion joints 22 of Fig. 4 are also identical in every detail with those described respecting the duct installation and the description there given need not here be repeated.

It will be noted that the outer ends of pins 30 are not engaged by Nelson speed clips, as was the case with the permanent pins 12 and pins 15 of the duct insulation assembly, but instead such ends are threaded to receive nuts 32, which nuts tighten on said pins to engage against a plate 33 placed atop the stucco lath 18. However, as both of these types of engaging means are quite commonly used, either type may be used to effectively hold said pins.

Having thus described my invention, what I claim to be new and novel and desire to secure by Letters Patent of the United States, is:

1. Means for insulating the expansible and contractable walls of heat conducting units having their outer surfaces divided into sections, comprising: an upstanding anchor pin welded at a predetermined spot on each section, a plurality of pin guide members welded to each section at selected spaced apart locations thereon each member having its longitudinal axis radially disposed in relation to its anchor pin, an upstanding pin guideably disposed in each member, a composite insulating panel impaled upon the upstanding pins of each section, and flexible insulation packed between the lateral edges of the panels and a continuous sheet of canvas adheringly secured to the outer surfaces of said panels to flexibly overlie said flexible insulation.

2. Means for insulating the expansible and contractable walls of heat conducting units having their outer surfaces divided into sections, comprising: an upstanding anchor pin welded at a predetermined spot on each section, a plurality of pin guide members welded to each section at selected spaced apart locations thereon each member having its longitudinal axis radially disposed in relation to its anchor pin for movement toward and from the latter upon the expansion and contraction of said walls, an upstanding pin guidably disposed in each member, a composite insulating panel impaled upon the upstanding pins of each section, and flexible insulation packed between the lateral edges of the panels and a continuous sheet of canvas adheringly secured to the outer surfaces of said panels to flexibly overlie said flexible insulation and to therewith provide insulated expansion joints between the panels.

3. Means for insulating the expansible and contractable walls of heat conducting units having their outer surfaces divided into sections, comprising: an upstanding anchor pin welded at a predetermined spot on each section, a plurality of pin guide members welded to each section at selected spaced apart locations thereon each member having its longitudinal axis radially disposed in relation to its anchor pin for movement toward and from the latter upon the expansion and contraction of said walls, an upstanding pin guideably disposed in each member, a composite insulating panel impaled upon the upstanding pins of each section in juxtaposed planar relationship with the panels of the remaining sections, and flexible insulation packed between the lateral edges of the panels and continuous sheets of canvas adheringly secured to the outer surfaces of said panels to flexibly overlie said flexible insulation and therewith provide insulated expansion joints between the panels.

WILLIAM W. GOTSHALL.

References Cited in the file of this patent

UNITED STATES PATENTS

| Number | Name | Date |
| --- | --- | --- |
| 1,993,792 | Manske et al. | Mar. 12, 1935 |
| 2,178,782 | Dunlap | Nov. 7, 1939 |
| 2,223,215 | Kunz et al. | Nov. 26, 1940 |
| 2,389,622 | Hensel | Nov. 27, 1945 |